United States Patent
Jakobsson

(10) Patent No.: US 9,460,278 B2
(45) Date of Patent: *Oct. 4, 2016

(54) AUTOMATIC PIN CREATION USING PASSWORD

(71) Applicant: PAYPAL, INC., San Jose, CA (US)

(72) Inventor: Bjorn Markus Jakobsson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,057

(22) Filed: Mar. 18, 2015

(65) Prior Publication Data

US 2015/0193610 A1 Jul. 9, 2015

Related U.S. Application Data

(63) Continuation of application No. 14/271,266, filed on May 6, 2014, now Pat. No. 9,305,152, which is a continuation of application No. 13/728,926, filed on Dec. 27, 2012, now Pat. No. 9,009,802, which is a continuation of application No. 13/281,273, filed on Oct. 25, 2011, now Pat. No. 8,756,652.

(60) Provisional application No. 61/409,869, filed on Nov. 3, 2010.

(51) Int. Cl.
*G06F 21/31* (2013.01)
*G06F 21/46* (2013.01)

(52) U.S. Cl.
CPC ............... *G06F 21/31* (2013.01); *G06F 21/46* (2013.01)

(58) Field of Classification Search
CPC .................................. G06F 21/31; G06F 21/46
See application file for complete search history.

(56) References Cited

U.S. PATENT DOCUMENTS

| | | | |
|---|---|---|---|
| 6,643,784 B1 | 11/2003 | McCulligh | |
| 7,552,467 B2 | 6/2009 | Lindsay | |
| 8,423,783 B2 * | 4/2013 | Buhler | G06F 21/34 |
| | | | 713/185 |
| 2003/0005329 A1 | 1/2003 | Ikonen | |
| 2004/0249503 A1* | 12/2004 | Sanchez | G06F 21/42 |
| | | | 700/237 |
| 2005/0139658 A1 | 6/2005 | Lambert et al. | |
| 2006/0294392 A1 | 12/2006 | Veprek et al. | |
| 2008/0109896 A1 | 5/2008 | Millar | |

(Continued)

OTHER PUBLICATIONS

Guan, Li, "Multi-View Dynamic Scene Modeling", dissertation of PHD, 2010, 160 pages, UNC Chapel Hill, North Carolina, United States; http://www.cs.unc.edu/cms/publications/dissertations/guan_li.pdf.

*Primary Examiner* — Saleh Najjar
*Assistant Examiner* — Oleg Korsak
(74) *Attorney, Agent, or Firm* — Haynes and Boone, LLP

(57) ABSTRACT

A PIN is automatically generated based on at least one rule when the user enters a password through a user device. In one example, the PIN is a truncated version of the password where each character in the truncated version is mapped onto a number. The mapping can be a truncation at the beginning or end of the password, or the mapping can be with any pattern or sequence of characters in the password. This PIN generation may be transparent to the user, such that the user may not even know the PIN was generated when the password was entered. When the user attempts to access restricted content, the user may enter the PIN instead of the password, where the user may be notified of the rule used to generate the PIN so that the user will know the PIN by knowing the password.

22 Claims, 4 Drawing Sheets

(56) References Cited

U.S. PATENT DOCUMENTS

| | | |
|---|---|---|
| 2008/0250481 A1 | 10/2008 | Beck et al. |
| 2009/0064290 A1 | 3/2009 | Norman et al. |
| 2009/0193263 A1 | 7/2009 | Gnech et al. |
| 2010/0024028 A1 | 1/2010 | Baugher et al. |
| 2010/0131408 A1 | 5/2010 | Perlman et al. |
| 2010/0191630 A1* | 7/2010 | Zito ............... G06Q 20/102 705/30 |
| 2012/0096535 A1 | 4/2012 | Popp et al. |

* cited by examiner

AUTOMATIC PIN CREATION USING PASSWORD

CROSS REFERENCE TO RELATED APPLICATIONS

This application is a continuation of U.S. application Ser. No. 14/271,266, filed on May 6, 2014, which is a continuation of U.S. application Ser. No. 13/728,926, filed on Dec. 27, 2012, which is a continuation of U.S. application Ser. No. 13/281,273, filed on Oct. 25, 2011, now U.S. Pat. No. 8,756,652, which are related to and claim priority to U.S. Provisional Patent Appl. Ser. No. 61/409,869, filed on Nov. 3, 2010, all of which are incorporated herein by reference in their entirety.

BACKGROUND

1. Field of the Invention

The present invention generally relates to Personal Identification Number (PIN) creation and more particularly to automatic creation of PINs.

2. Related Art

PINs or Personal Identification Numbers are used to identify or authenticate a user, such as at an ATM machine, to access account information, such as through a smart phone, a computer or PC, or through a telephone. PINs are typically preferred by the user for use on phones or other devices having numerical keypads. One reason is that PINs are shorter, and therefore faster to enter. Another is that PINs typically have fewer characters (i.e., only 0-9), which means that these keys can be made larger, and therefore easier for the user to enter on a device. Further yet, PINs, which do not require a full QWERTY keyboard, are suitable for smaller numeric keypads.

However, PINs are typically less secure than passwords because each digit of a PIN only has 10 possibilities (0-9), while each digit of a password can have 52 possibilities (letters A-Z, both upper and lower case) or more if other characters such as numbers and symbols are also available. Furthermore, PINs are less secure because they typically exhibit stronger patterns for ease of memory by the user, e.g., it has been reported that one in five users choose their PIN as a date. Since there are only 365 days in a year, this clearly does not take advantage of the full potential of all the 10000 combinations afforded by having four digit PINs.

There are many other reasons why PINs have slight drawbacks, such as being harder to remember (unless the user chooses an easily remembered pattern, such as a date).

A further disadvantage of PINs is that users may be required to create or generate a new PIN for access through a mobile device or device with a numerical keypad, even though the user already has a password for access through the user's PC, laptop, or home/work computer. This results in a more difficult on-boarding process for the user, which may lead to the user reducing or even eliminating use on affected mobile applications. Even if a user decides to create a PIN, the user may need to first enter a password through the mobile device, thereby exposing the password to possible fraudsters. This can be problematic, as mobile environments tend to be less secure than non-mobile environments.

Therefore, there is a need for a PIN generation that overcomes the disadvantages of conventional methods discussed above.

SUMMARY

In one embodiment of the present invention, a PIN is generated automatically when the user enters a password through a user device, such as a PC or laptop. The PIN is a truncated version of the password where each letter or character is mapped onto a number, and where, as a result, the PIN digits correspond to the characters of the password. The truncation can be from the beginning or the end of the password, or any other well-defined portion, such as from the third character of the password. It can also be a specific sequence, e.g., the first, third, fourth and sixth character of the password. Also, the length of the PIN may vary, depending on system requirements and other factors. In one embodiment, the truncation is the first four characters of the password. For example, if the password is "BeEF7gulP", the automatically generated PIN is "2333", which corresponds to the first four characters of the password mapped onto digits. The remaining characters (7gulP) are not used. This PIN generation may be transparent to the user. In other words, the user may not even know the PIN was generated when the password was entered.

When the user attempts to log in or obtain access through a mobile device or other device utilizing a numerical keypad (which may also contain characters), the user may be notified that the PIN to enter is the first four characters of the user's password, but mapped to numbers on the keypad. Thus, the user enters "2333" to log in the site associated with the password "BeEF7gulP".

As a result, the user has a PIN that is easily remembered, without having to create a PIN separately. This provides the user with a more friction-less experience. In addition, the PIN entered into the device will be difficult for a fraudster to determine the associated password since the PIN is shorter and not a complete representation of the password. Furthermore, since each number of the PIN can map to seven different possibilities (the digit itself, three upper case letters, and three lower case letters), and in the case of the number 9, nine possibilities (the digit and four letters, upper and lower case). Foreign keyboards may have slightly different mappings due to different alphabets, but the same principles apply.

These and other features and advantages of the present disclosure will be more readily apparent from the detailed description of the embodiments set forth below.

Figure 1:
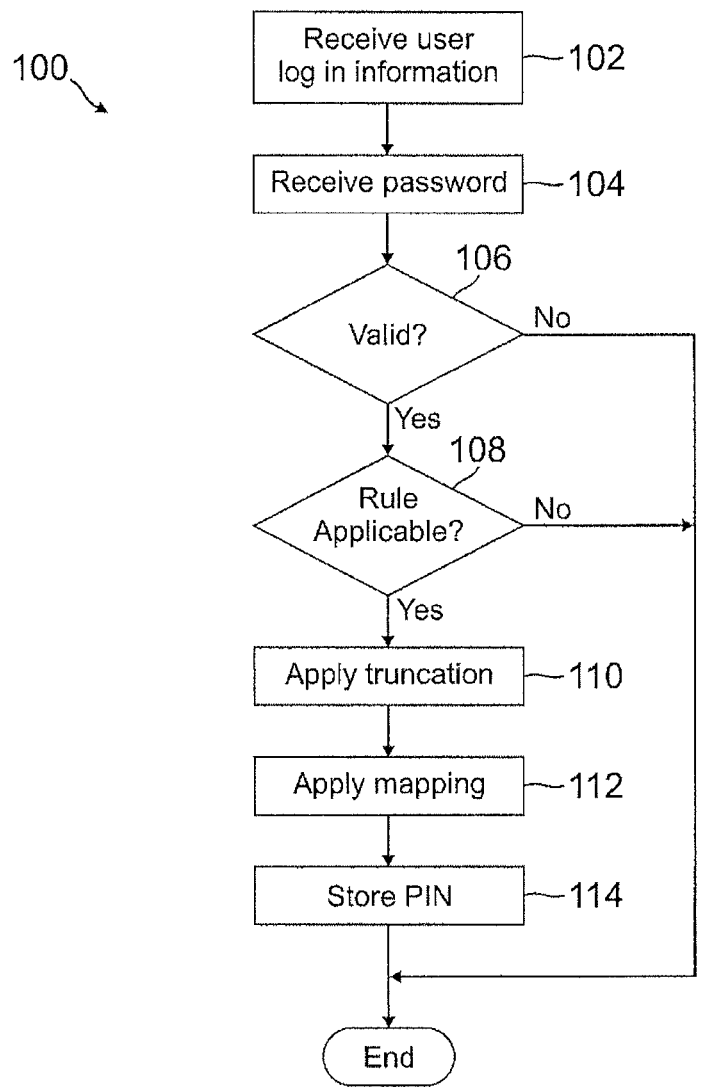
FIG. 1 is a flowchart showing one embodiment of an automatic PIN generation process by a site or service provide.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A user may have many different accounts or sites that require a password for entry or access. A user may have one password for all, a few passwords for all, or a different password for each account or site. Typically, if the user has numerous accounts, a few passwords are used for all the accounts, with some passwords used with multiple different accounts.

When the user accesses an account or site, such as through the user's PC, smart phone, tablet, or laptop, the user enters the requested password. If the site authenticates the password, and a PIN had not been previously created, the site automatically creates a PIN, if applicable, with the password by converting characters (which may include letters, numbers, and symbols) to numbers and truncating if needed. This depends on the site requirements and other factors. For example, if the site requires a six number PIN for mobile devices (or other devices), then the password is truncated to a six number PIN. If the user password only has six characters, there is no truncation. Thus, the length of the PIN and the amount of truncation may vary from site to site and from password to password. If the password is not long enough to create a PIN of the desired format or length or contains characters that cannot be mapped (such as % $#), then there may be no mapping. Alternatively, a shorter temporary PIN may be created, or another selection can be used in order to avoid the characters that cannot be mapped. Alternatively, the user may be instructed how to map these characters (e.g., any character that is not found on the keypad is entered as the digit "0"), and the corresponding mapping done on the backend, as the PIN is first derived from the password.

Where the truncation occurs may also vary. In different embodiments, the end of the password is truncated, the beginning is truncated, the ends are truncated, and/or the interior is truncated. Truncation may also vary depending on the password. For example, if a default truncation is the end (i.e., PIN mapping starts at the beginning of the password), but the relevant portions of the password in the beginning cannot be mapped (e.g., contains symbols), a PIN may still be created using another portion of the password, such as the end of the password (in this case, the beginning of the password is truncated). It may be preferred to start at the beginning of the password (end truncation) to make it easier for the user to remember and enter the PIN.

There may be situations where a PIN cannot be created from the user password. For example, the password may contain less characters than the required PIN, or the password may contain characters that cannot be mapped to numbers, such as symbols or punctuation marks. There may also be situations where a PIN should not be created from the user password due to policy or security reasons. For example, if the password contains numbers that correspond to the PIN, the PIN may not be created because such a PIN could be easily determined or obtained by fraudsters. Also, it is possible that a password is strong but results in a PIN that is traditionally seen as weak. For example, the password "0123joeCanFlyn0w" may be strong, but the derived PIN "0123" may be considered weak. In such cases, the derived PIN may be considered unsuitable and not stored, or a different policy used.

Table 1 below provides some examples of PIN generation for different rules. It is possible for one financial organization to create multiple PINs from one user password, using potentially different rules for each. This way, there can be one PIN for ATMs, one for mobile applications, etc. This will not be a big burden for the user, who will determine how to map his/her password on an as-needed basis. It may improve the security of the system, though, as it slightly compartmentalizes PINs.

TABLE 1

| Password | PIN | Rule |
| --- | --- | --- |
| bird123 | 2473 | First four characters |
| WxpptPPRsT | 997787 | First six characters |
| Rd$$CarTNT | No PIN generated | First four characters |
| Rd$$CarTNT | 7800 | Last four characters and $ maps to 0 |
| Rd$$CarTNT | 7868 | Last four characters |
| aB3Zr*L | 2239 | First four characters |

If a successful PIN has been generated, the site stores the PIN and associates the PIN with the user account. PINs can be stored in a secured format, such as what is done with passwords. This makes it harder for an attacker gaining access to an internal password or PIN database to extract the clear text passwords and PINs. If a PIN cannot or is not created, no PIN is stored, and the user will still have to log in using a password through the mobile device (or create a PIN).

After PIN creation, the user accesses a mobile application (App) or site through the mobile device, such as through a mobile web. Note that other devices may also be suitable here, such as Coinstar terminals, POS terminals, ATMs, and other devices having a numerical keypad on which letters have been overlaid or included, such as a typical telephone keypad. The user is asked to enter a PIN and informed of the rule for mapping the password to the PIN. For example, the user may be notified to use the first X characters of the user's password, mapped to numbers on the keypad. This notification may occur only on the first time the user logs in with the PIN or at each log in session.

The user then enters the numbers, and the site attempts to authenticate the PIN, which includes comparing the entered PIN with what was stored previously during PIN creation. If the PIN and user are authorized, the site provides access to the user without the user having to enter a password or create a PIN.

If the user changes the password at some time, the site may retain the previously created PIN, ask the user whether they wish to retain the PIN or have the site generate a new PIN based on the new password, or automatically generate a new password from the new PIN when the user first uses the new password through a user device, such as a PC or laptop. Two possible PINs (the old one and the new one) can both be temporarily stored and selected the first time the user inputs one of them. Then only the one entered by the user will be subsequently accepted. This way, if a user has started to remember his/her PIN by the numbers, as opposed to performing the mapping each time, then a password change will not cause the PIN to change.

If a PIN has not been created for the user, the user may be asked to enter the password into the device for access. The user may then be asked to create a PIN through the device or a PIN is automatically created as discussed above.

FIG. 1 is a flowchart 100 showing one embodiment of an automatic PIN generation process by a site or service provider, such as PayPal, Inc. of San Jose, Calif. At step 102, the service provider receives log in information from a user through a user device. Note that service provider, as used herein, refers to an online site or service provider that needs a PIN to allow a user to access sensitive information on the site or with the service provider. The user log in information may be an email, a phone number, a user name, or other identifier that allows the service provider to identify the user. The user may enter the log in information, such as through typing or voice, into the user device, such as a smart phone, a PC, a tablet, or other computing and communicating device by first accessing the service provider, such as through a mobile app or a browser.

At step 104, the service provider receives a password from the user, again through the user device. Step 104 may be performed at the same time as step 102. For example, the user may see a log in screen upon accessing the service provider, where the log in screen requests the user to enter the user identifier and the password into designated fields or boxes. The password may be received from any user device.

Once received, the service provider determines, at step 106, whether the password is valid. This determination may include determining whether the received password matches the password associated with the user account maintained by the service provider. If not, the service provider may request the user to enter the password and/or user identifier again. If the service provider is unable to match the password with what is expected after a specified number of attempts, the user will be denied access and the process ends.

If the password is valid, the service provider determines, at step 108, whether a PIN creation rule can be applied. The service provider may analyze the received password and one or more acceptable rules to determine if the rule can be used for the particular password. For example, using Table 1 above, if the rule for PIN creation is to use the first four characters, but the password received was "Rd$$CarTNT," then the applicable rule cannot be applied because there is no mapping of the "$" symbol to a number. In this case, the process ends, and no automatic PIN creation is created. In another embodiment, the service provider may attempt to apply a different rule to the password so that a PIN can be generated. For example, there may be a rule that maps the "$" symbol to a number or a rule may be applied that utilizes the last four characters of the password. In the latter case, a PIN can be generated as "7868".

If a rule can be applied, as determined at step 108, the password is first truncated according to the rule at step 110. As discussed herein, the password can be truncated at the beginning, at the end, somewhere in the interior, or following a particular sequence. After truncation, the remaining characters of the password are mapped to a number, at step 112, again according to the rule. Letters may be mapped to corresponding numbers on a standard number pad. Symbols and other non-letters may be mapped to specific numbers. For example, a rule may map the following symbols "! @ # $ ^ & * ( )" to "1 2 3 4 5 6 7 8 9 0", respectively. This corresponds to the numbers associated with the particular symbol on a standard QWERTY keypad. Other mappings may also be possible for different rules. The PIN is thus generated or created after step 112.

Once generated, the PIN is stored at step 114, such as within a database managed by or accessible to the service provider. The PIN is associated with the user account and password. In one embodiment, prior to storage, the service provider may determine whether the generated PIN is acceptable, such as based on security reasons, as discussed above. For example, the generated PIN may be 1234, which may be unacceptable to the service provider due to its ease of discovery by fraudsters. In this case, the PIN may not be stored, even though it was created. The user therefore will still need to use the user's password or create a PIN as with conventional methods.

Figure 2:
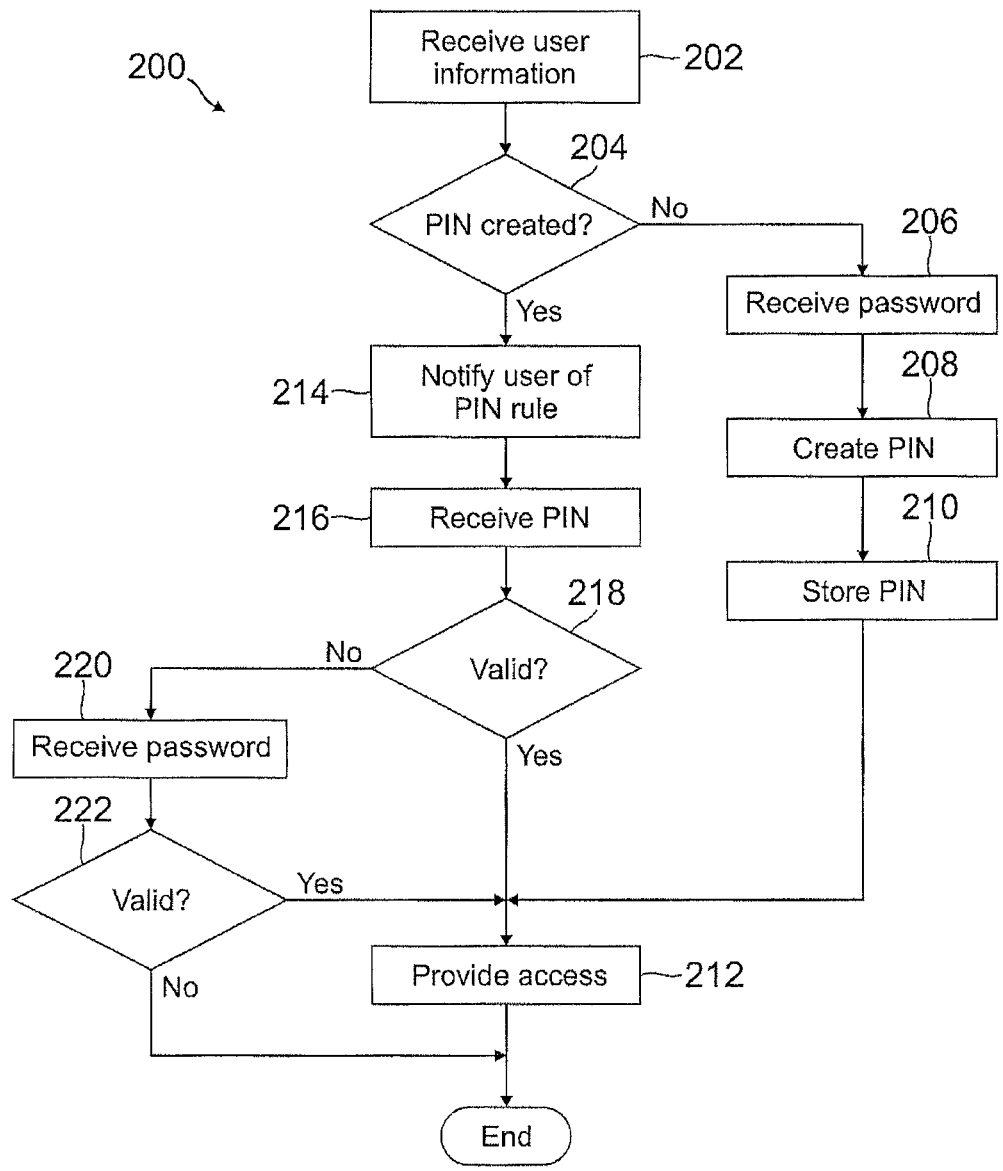
FIG. 2 is a flowchart showing one embodiment of a process a site or service provider performs when a user attempts a log in through the mobile device or other suitable device.

FIG. 2 is a flowchart 200 showing one embodiment of a process a site or service provider performs when a user attempts a log in through the mobile device or other suitable device, such as a PC or tablet. At step 202, the service provider receives user information, such as a user name, email address, phone number, etc. This information may be received from the user device and communicated electronically to a server managed or maintained by the service provider. Using the received information, the service provider accesses the account associated with the user information, such as by determining whether an account exists that matches the user information through a database search. If a valid account is located, the service provider determines, at step 204, whether a PIN has been created for this account. For example, the account may have an associated password, but no corresponding PIN or PIN created using the process described herein.

If no PIN was created using the process described herein, the user may be asked to enter a password for the account in order to access the account, content, or site. The user may enter the password in a field on the user device, such as by typing it into a keyboard/keypad. The user may also enter the password by voice. Once entered, the user communicates the password, through the user device, to the service provider, who then receives the password at step 206.

The service provider determines if the password is the correct one associated with the user account. If so, a PIN is created based on the password at step 208. PIN creation can be based on various rules as discussed herein and in FIG. 1, such as mapping the first four characters of the password to numbers. If a valid PIN can be created, the PIN is stored at step 210, such that the user account is now associated with both a password and a PIN, even though the user did not actually create or pick the PIN. The service provider may create the PIN without the user knowing or having to do anything, since the PIN generation can be automatically created using system rules. Once created, the user is provided access at step 212. Note that the user may be provided access as soon as the user's password, received at step 206, has been verified by the service provider. Steps 208 and 210 for PIN creation and storage can be done during or after access is granted.

Returning back to step 204, if a PIN has been created for the user, such as subsequent times the user attempts to access content from the service provider after steps 208 and 210 have been performed, the user may be notified, at step 214, through the user device that the user can access the content or login using a PIN instead of the user's password. The notification may inform the user that a PIN has been created and is available for use in place of the password. The notification may be a one-time notification that occurs the first time a user attempts to login after the PIN is created. In other embodiments, the notification may be continuous or provided at intervals, such as informing the user that the user can login using the password or a PIN. The notification may be triggered any time the PIN changes, such as the user changing the user's password, which may automatically create a new PIN based on rules. The notification may also include a rule or instructions to the user for converting the user password to a PIN. This is needed, especially for the first time the user decides to login using the PIN because the user will not know what the PIN is since the PIN was created automatically from the user password. For example, the user may be informed that the PIN is the first four characters of the user's password mapped into corresponding numbers a PIN or keypad.

The user then enters the PIN, such as through a PIN or keypad from the user's device. After entry, the PIN may be transmitted electronically to the service provider, who then receives the PIN at step 216. Note that in different embodiments, the user information and the PIN may be received through the same transmission. In this case, when the user attempts to access content from a service provider or site, the user enters in a user ID and the PIN at the same time. The service provider may then access the user's account to determine whether a PIN is associated with the user's account and whether the PIN received from the user is the correct one associated with the account.

Regardless of the sequence, when the PIN is received, the service provider determines whether the PIN is valid at step 218. This can be done by comparing the received PIN with the PIN stored with the service provider and corresponding to the user account. If the PIN is valid, the user is provided access at step 212.

However, if the PIN is not valid, which may be the result of the user entering a wrong PIN even though the user is the correct user associated with the account. This may happen if the user misunderstands the rule for converting the password to the PIN or the user simply erroneously enters the PIN. The user may be given the option of reentering the PIN or entering the password. If the latter, the user enters the password, such as through key entry on the user device, and transmits the password to the service provider.

The service provider receives the user entered password at step 220 and determines whether the received password is valid at step 222. The determination may include comparing the received password with the password associated with the user account. If the password is valid, the user may be provided access at step 212. If the password or PIN is not valid (after a specified number of attempts), the user will not be given access until the user can be authenticated.

The PIN may remain the same as long as the password remains unchanged. However, the PIN may change in different embodiments to increase security. For example, the user may be given different rules at different times. For example, the user may initially be given the rule to map the first four characters of the password to numbers. At another time, the user may be given the rule to map the last four characters to numbers. The times may vary or be periodic. The times may be based on the number of times a user accesses the service provider, the duration between successive accesses, or other metrics.

Thus, using the process described herein, a user may be able to access content, such as a user account, a site, or other restricted areas by entering a PIN instead of a password. This makes it easier for the user since a PIN is typically shorter and can be easily entered through a numerical PIN pad. The PIN can be remembered by the user because it is based on the user password, so that the user does not need to remember a separate PIN and password. The user may be given a rule for converting the password to the PIN so that the user may not even need to remember the rule. The PIN can be more secure because it may change even when the password does not change.

Figure 3:
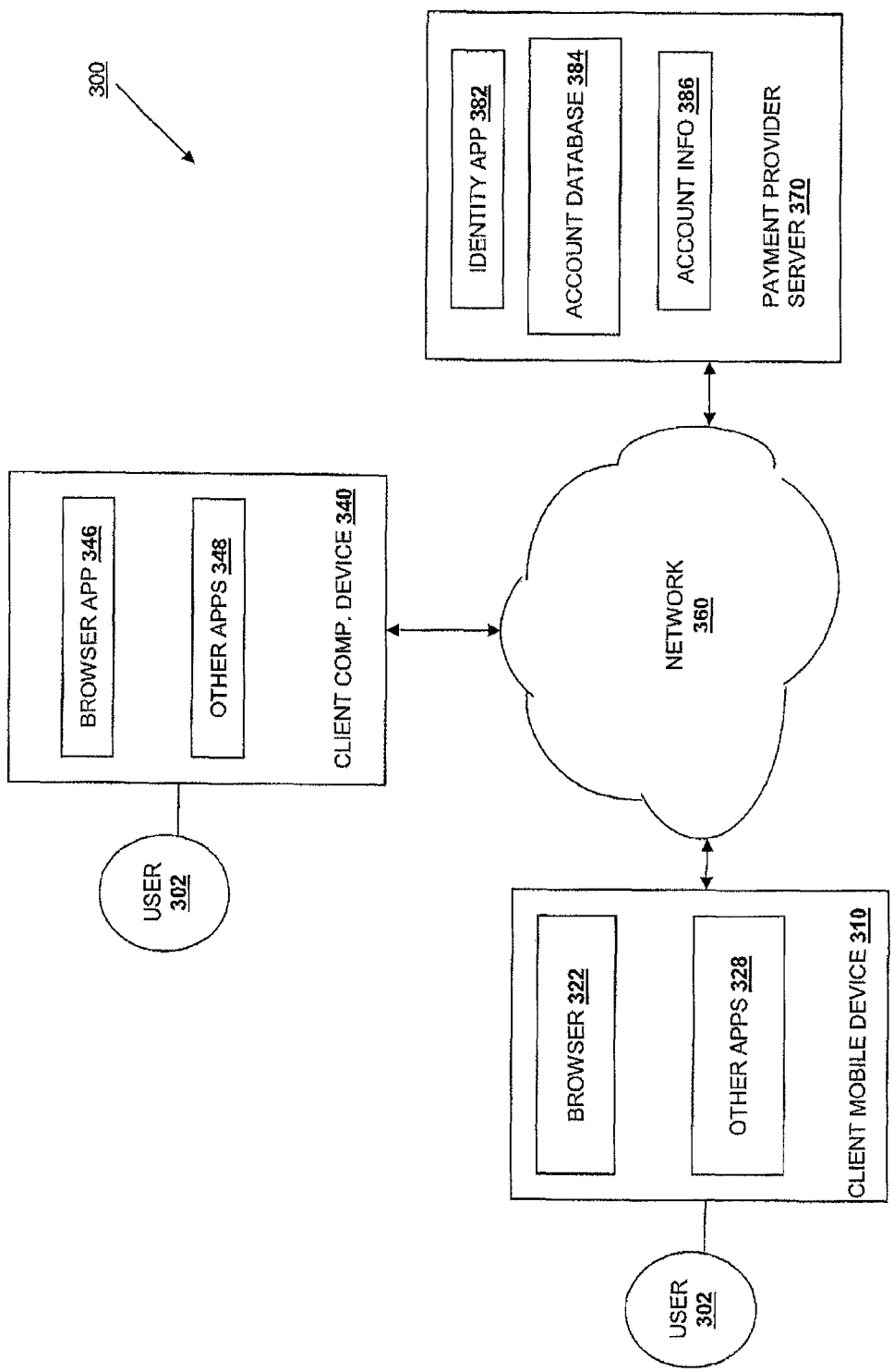
FIG. 3 is a block diagram of a networked system that can be used in the method of FIGS. 1 and/or 2 according to an embodiment of the invention.

FIG. 3 is a block diagram of a networked system 300 that can be used in one or more processes, such as described above, according to an embodiment of the invention. System 300 includes a client mobile device 310, a client computing device 340, and a payment service provider server 370 in communication over a network 360. Payment service provider server 370 may be maintained by a payment provider, such as PayPal, Inc. of San Jose, Calif. Server 370 may be maintained by other service providers in different embodiments. Payment service provider may be more generally a web site, an online content manager, a service provider, such as a bank, or other entity who provides content to a user requiring user authentication or login.

Network 360, in one embodiment, may be implemented as a single network or a combination of multiple networks. For example, in various embodiments, network 360 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client mobile device 310, in one embodiment, may be implemented using any appropriate combination of hardware and/or software configured for wired and/or wireless communication over network 360. For example, client mobile device 310 may be implemented as a wireless telephone (e.g., smart phone), tablet, personal digital assistant (PDA), notebook computer, and/or various other generally known types of wired and/or wireless mobile computing devices. It should be appreciated that, in various embodiments, client mobile device 310 may be referred to as a user device or a customer/client device without departing from the scope of the present disclosure.

Client mobile device 310, in one embodiment, may include one or more browser applications 322, such as mobile browser apps, which may be used to provide a user interface to permit user 302 to browse information available over network 360. For example, browser application 322 may be implemented as a web browser to view information available over network 360. In one implementation, browser application 322 comprises a software program, such as a graphical user interface (GUI), executable by a processor that is configured to interface and communicate with the payment provider server 370 or other servers managed by content providers or merchants via network 360. For example, user 302 is able to access websites to find and purchase items, as well as access user account information or web content. User 302, through client mobile device 310, may also communicate with payment provider server 370 to create an account and make a payment to the merchant.

As such, client mobile device 310, in one embodiment, may include other applications 328 as may be desired in one or more embodiments to provide additional features available to user 302, including accessing a user account with payment provider server 370. For example, applications 328 may include interfaces and communication protocols that allow the user to receive and transmit information through the payment provider and other online sites. Applications 328 may also include security applications for implementing client-side security features, programmatic client applications for interfacing with appropriate application programming interfaces (APIs) over network 360 or various other types of generally known programs and/or applications. Applications 328 may include mobile Apps downloaded and resident on client mobile device 310 that enables user 302 to access content through the Apps.

Client computing device 340, which can be similar to client mobile device 310, may be a separate device, such as a PC or laptop, or may be omitted if the user will be using only client mobile device 310 for automatic PIN generation. Both user devices may be used to access content with the payment/service provider or other content provider through automatic PIN generation.

Client computing device 340, in one embodiment, may include a browser application 346 and other applications 348, similar to browser application 322 and applications 328 in client mobile device 310. Browser application 346 and applications 348 enable the user to access a payment provider web site and communicate with payment provider server 370, as well as other online sites.

Payment provider server 370, in one embodiment, may be maintained by an online payment provider, which may provide processing for online financial and information transactions on behalf of user 302. Payment provider server 370 may include at least one identity application 382, which may be adapted to interact with the client mobile device 310 and/or client computing device 340 over network 360 to facilitate access to accounts and the purchase of items, products and/or services by user 302.

Payment provider server 370, in one embodiment, may be configured to maintain a plurality of user accounts in an account database 384, each of which may include or be separate from an account information 386 associated with individual users, including user 302. For example, account information 386 may include identity information of user 302, such as one or more full names, business names, street addresses, email addresses and phone numbers, website addresses, or other types of financial information, which may be used to facilitate online transactions for user 302, as well as password and/or PIN for users. As such, identity application 382 may be configured to interact with a user to authenticate the user through a password or PIN and automatically generate and store a PIN from the password. Payment provider server 370 may also include a rules processor that automatically generates a user PIN based on the user password, applies or varies rules as needed, and manages the access of the user through the generated PINs.

Figure 4:
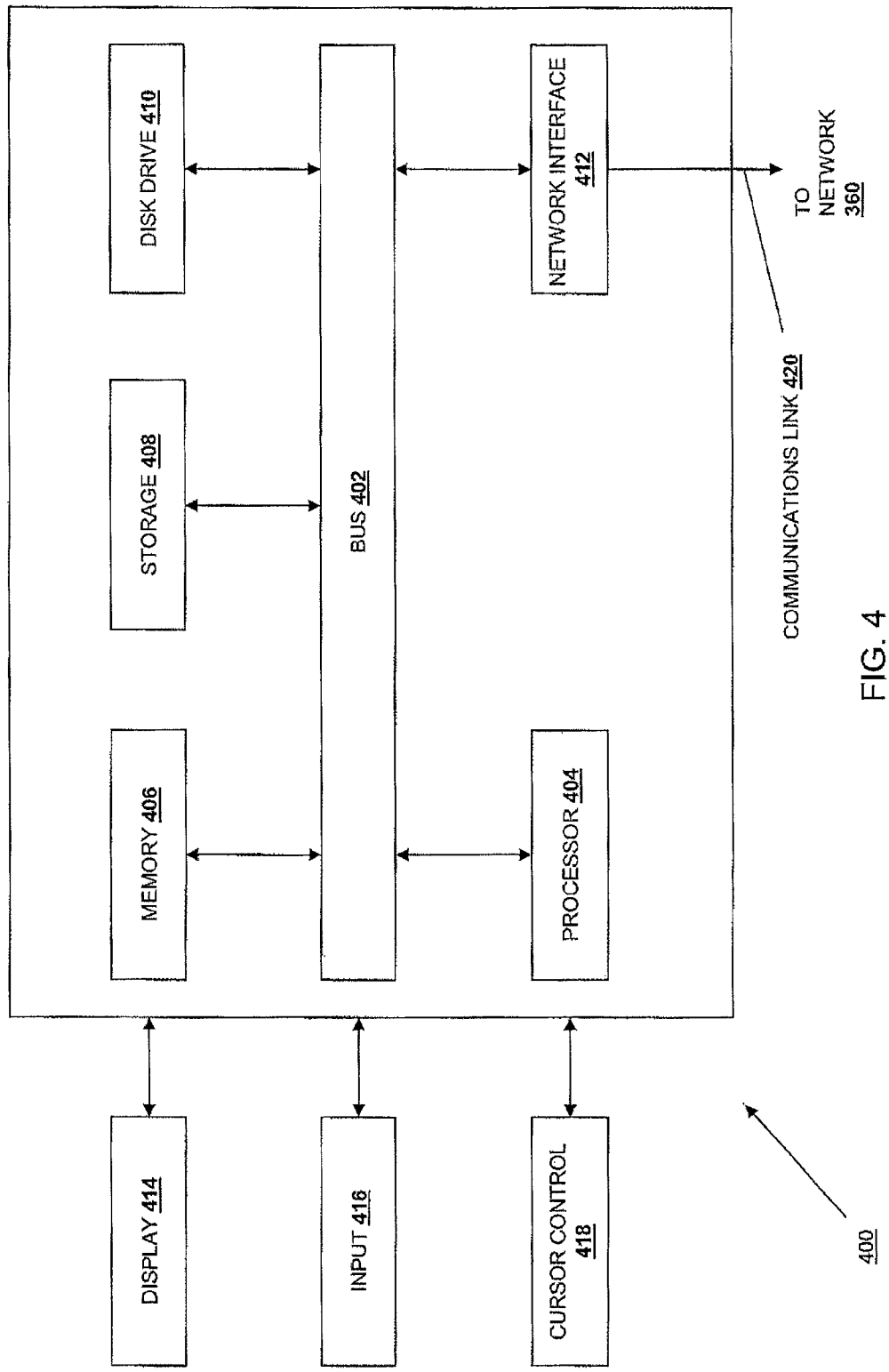
FIG. 4 shows an embodiment of a computer system suitable for implementing the various devices described herein.

FIG. 4 is a block diagram of a computer system 400 suitable for implementing one or more embodiments of the present disclosure. In various implementations, the user devices may comprise a personal computing device (e.g., a personal computer, laptop, smart phone, tablet, PDA, etc.) capable of communicating with the network. The payment provider may utilize a network computing device (e.g., a network server) capable of communicating with the network. It should be appreciated that each of the devices utilized by users and payment providers may be implemented as computer system 400 in a manner as follows.

In accordance with various embodiments of the present disclosure, computer system 400, such as a smart phone, personal computer, and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard, keypad, or virtual keyboard), and a cursor control component 418 (e.g., mouse, pointer, or trackball). In one implementation, disk drive component 410 may comprise a database having one or more disk drive components.

Computer system 400 may perform specific operations by processor 404 executing one or more sequences of instructions contained in system memory component 406, such as described above with respect to the user and/or payment provider in FIGS. 1 and 2. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by a communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and a communication interface 412. Network interface component 412 may include an antenna, either separate or integrated, to enable transmission and reception via communication link 420. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A service provider system comprising:
a non-transitory memory storing information about a user account and identification information of a user associated with the user account; and
one or more hardware processors configured to execute instructions to cause the service provider system to perform operations comprising:
automatically generating a first access credential from a second access credential for the user account, wherein the first access credential is generated based on a rule comprising mapping individual characters of the second access credential to numbers or characters, and wherein the first access credential is unknown to the user and the second access credential is known to the user;
providing instructions to a user device of the user, wherein the instructions comprise the rule to convert, by the user on a device, the second access credential to the first access credential;
receiving a user-entered access credential and identification information from the device;
comparing the user-entered access credential with the first access credential associated with the user account, wherein the user-entered access credential is known to the user through the instructions provided to the user for converting the second access credential to the user-entered access credential and wherein the first access credential is different than the second access credential; and
granting access to the user account for the user when the user-entered access credential matches the first access credential.

2. The system of claim 1, wherein the first access credential is not longer than the second access credential.

3. The system of claim 1, wherein the second access credential is a password and the first access credential and the user-entered access credential are numeric personal identification numbers (PINs).

4. The system of claim 3, wherein the PINs are four digits in length.

5. The system of claim 1, wherein the instructions include truncating characters in the second access credential.

6. The system of claim 1, wherein the instructions include mapping specific characters in the second access credential to numbers.

7. The system of claim 1, wherein the first access credential is generated when a user logs into a site of the service provider using the second access credential.

8. A method, comprising:
automatically generating, by a service provider, a converted credential from a password for a user account and identification information of a user associated with the user account, wherein the converted credential is generated based on a rule comprising mapping individual characters of the password to numbers or characters, and wherein the converted credential is unknown to the user;
providing instructions to a user device of a user, wherein the instructions instruct comprise the rule to convert, by the user on a device, the password to the converted credential;
receiving, by the service provider, a user-entered credential and a user identifier from the device;
comparing the user-entered credential with the converted credential associated with the user account and automatically generated by the service provider from the password associated with the user account, wherein the user-entered credential is known to the user through instructions provided to the user for converting the password to the user-entered credential and wherein the converted credential is different than the password; and
granting access to the user account for the user when the user-entered credential matches the converted credential.

9. The method of claim 8, further comprising displaying the instructions on the user device.

10. The method of claim 8, wherein the password is used to generate a plurality of stored credentials based on a corresponding plurality of rules.

11. The method of claim 8, wherein the password is an alphanumeric password, the user-entered credential and the converted credential are numeric PINs, and the converted credential is shorter than the password.

12. The method of claim 8, wherein the instructions comprise mapping individual characters of the password to numbers.

13. The method of claim 8, wherein the instructions map only a portion of the password to numbers or characters.

14. The method of claim 8, wherein the converted credential is different for each of a plurality of websites accessible by the user.

15. The method of claim 8, wherein the instructions comprise truncating at least a portion of the password.

16. The method of claim 15, wherein the at least a portion is a start or an end of the password.

17. The method of claim 15, wherein the at least a portion is an interior section of the password.

18. A method, comprising:
automatically generating, by a service provider, an access credential from a password for a user account and identification information for a user associated with the user account, wherein the access credential is generated based on a rule comprising mapping individual characters of the password to numbers or characters, and wherein the access credential is unknown to the user;
providing instructions to a user device of a user, wherein the instructions comprise the rule to convert, by the user on a device, the password to the access credential;
receiving, by the service provider, an access credential and a user identifier from the device;
comparing the access credential with a converted credential associated with the user account and automatically generated by the service provider from the password associated with the user account, wherein the access credential is known to the user through the instructions provided to the user for converting the password to the access credential and wherein the converted credential is different than the password; and
granting access to the user account for the user when the access credential matches the converted credential.

19. The method of claim 18, wherein the password is used to generate a plurality of different converted credentials.

20. The method of claim 18, wherein the password is an alphanumeric password, the access credential and the converted credential are numeric PINs and are shorter than the password.

21. The method of claim 18, wherein the instructions are displayed on the user device after the user enters the password.

22. The service provider system of claim 1, wherein the device comprises one of the user device, a point-of-sale device, and an automatic teller machine.

* * * * *